(12) United States Patent
Marton et al.

(10) Patent No.: US 11,336,974 B2
(45) Date of Patent: May 17, 2022

(54) INVISIBLE MICROPHONE ASSEMBLY FOR A VEHICLE

(71) Applicant: HARMAN BECKER AUTOMOTIVE SYSTEMS GMBH, Karlsbad-Ittersbach (DE)

(72) Inventors: Zsolt Marton, Zalaegerszeg (HU); Viktor Dobos, Budapest (HU)

(73) Assignee: Harman Becker Automotive Systems GmbH, Karlsbad-Itterbach (DE)

( * ) Notice: Subject to any disclaimer, the term of this patent is extended or adjusted under 35 U.S.C. 154(b) by 0 days.

(21) Appl. No.: 17/136,468

(22) Filed: Dec. 29, 2020

(65) Prior Publication Data

US 2021/0204044 A1 Jul. 1, 2021

Related U.S. Application Data

(60) Provisional application No. 62/955,134, filed on Dec. 30, 2019.

(51) Int. Cl.
*H04R 1/02* (2006.01)
*H04R 1/08* (2006.01)
*B60R 11/02* (2006.01)
*B60R 11/00* (2006.01)

(52) U.S. Cl.
CPC ............ *H04R 1/02* (2013.01); *B60R 11/0247* (2013.01); *H04R 1/08* (2013.01); *B60R 2011/0028* (2013.01); *B60R 2011/0045* (2013.01); *H04R 2499/13* (2013.01)

(58) Field of Classification Search
None
See application file for complete search history.

(56) References Cited

U.S. PATENT DOCUMENTS

| 2,165,637 | A | 7/1939 | Little |
| 4,337,380 | A | 6/1982 | Tezuka et al. |
| 7,110,553 | B1 | 9/2006 | Julstrom et al. |
| 7,555,118 | B2 | 6/2009 | Hawker et al. |
| 10,945,060 | B2 | 3/2021 | Riemann et al. |

(Continued)

FOREIGN PATENT DOCUMENTS

| DE | 102012017980 A1 | 3/2014 |
| DE | 102012017981 A1 | 3/2014 |

(Continued)

*Primary Examiner* — Kenny H Truong
(74) *Attorney, Agent, or Firm* — Brooks Kushman P.C.

(57) ABSTRACT

A microphone assembly for a vehicle headliner includes a housing arranged to be received within a substrate layer of the headliner and having an upper portion and a lower portion. A circuit board is mounted in the upper portion and has a microphone element coupled thereto. An insert bracket includes a base and a shaft member extending upwardly therefrom, the base having a plurality of apertures aligned with the shaft member, wherein the shaft member engages the lower portion to connect the insert bracket to the housing. A sealing gasket having at least one channel defining an air path extending therethrough is arranged to be received within the shaft member and extend between the base and the upper portion, providing acoustic sealing between the insert bracket and the housing such that the air path directs sound from a cabin of the vehicle through the apertures to the microphone element.

20 Claims, 5 Drawing Sheets

(56) References Cited

U.S. PATENT DOCUMENTS

| | | |
|---|---|---|
| 2002/0110256 A1 | 8/2002 | Watson et al. |
| 2008/0130934 A1 | 6/2008 | Bobisuthi et al. |
| 2012/0213399 A1 | 8/2012 | Li et al. |
| 2013/0208913 A1 | 8/2013 | Hook |
| 2014/0064546 A1 | 3/2014 | Szczech et al. |
| 2014/0294182 A1* | 10/2014 | Axelsson ............ H04R 1/1083 381/56 |
| 2015/0010191 A1 | 1/2015 | Baumhauer, Jr. et al. |
| 2015/0165983 A1 | 6/2015 | Pan et al. |
| 2019/0364351 A1 | 11/2019 | Riemann et al. |

FOREIGN PATENT DOCUMENTS

| | | |
|---|---|---|
| DE | 102013014526 A1 | 3/2015 |
| EP | 3402150 A1 | 11/2018 |

* cited by examiner

INVISIBLE MICROPHONE ASSEMBLY FOR A VEHICLE

CROSS-REFERENCE TO RELATED APPLICATIONS

This application claims the benefit of U.S. provisional application Ser. No. 62/955,134 filed Dec. 30, 2019, the disclosure of which is hereby incorporated in its entirety by reference herein.

TECHNICAL FIELD

Embodiments relate to an invisible microphone assembly for a vehicle, such as for a headliner.

BACKGROUND

Much effort has been expended to create a quiet cabin environment in vehicles. A typical goal in vehicle design is to minimize audible noise in the cabin. Consumers desire to be isolated from road noise, powertrain noise, and other unwanted noise sources. Vehicles may include various insulating materials between the cabin and noise producing components. However, the insulating materials may be expensive and add weight to the vehicle. Some modern vehicles include a noise management system to reduce the audible noise in a vehicle cabin. The noise management system may also operate by generating noises or sounds that enhance the driving experience.

The noise management system in a vehicle may operate by using microphones and loudspeakers to control the noise or sound. The active noise management system may detect audio signals via the microphones. The microphone signals may be processed and loudspeaker output signals may be generated. In addition, other communication systems in the vehicle rely on microphones placed in various positions of the vehicle. The addition of speech and active noise control microphones has resulted in visible microphone grills that disrupt the intended clean look of the vehicle interior, such as the headliner.

SUMMARY

In one or more embodiments, a microphone assembly for a headliner of a vehicle includes a housing arranged to be received within a substrate layer of the headliner, the housing having an upper portion and a lower portion. A circuit board is mounted in the upper portion, the circuit board having a microphone element coupled thereto. The microphone assembly further includes an insert bracket including a base and a shaft member extending upwardly therefrom, the base having a plurality of apertures aligned with the shaft member, wherein the shaft member engages the lower portion to connect the insert bracket to the housing. A sealing gasket having at least one channel defining an air path extending therethrough is arranged to be received within the shaft member and extend between the base and the upper portion, the sealing gasket providing acoustic sealing between the insert bracket and the housing such that the air path directs sound from a cabin of the vehicle through the apertures to the microphone element.

In one or more embodiments, a headliner assembly for a vehicle includes a headliner including a substrate layer having an opening and an A-surface layer that is acoustically transparent and is exposed to a cabin of the vehicle. The headliner assembly includes a microphone assembly including a housing arranged to be received within the substrate layer, the housing having an upper portion and a lower portion. A circuit board is mounted in the upper portion, the circuit board having a microphone element coupled thereto. The headliner assembly further includes an insert bracket including a base and a shaft member extending upwardly therefrom, the base having a plurality of apertures aligned with the shaft member, wherein the shaft member engages the lower portion to connect the insert bracket to the housing. A sealing gasket having at least one channel defining an air path extending therethrough is arranged to be received within the shaft member and extend between the base and the upper portion, the sealing gasket providing acoustic sealing between the insert bracket and the housing such that the air path directs sound from the cabin of the vehicle through the apertures to the microphone element.

In one or more embodiments, a microphone array for a headliner of a vehicle includes at least one housing arranged to be received within a substrate layer of the headliner, and a plurality of circuit boards mounted in the at least one housing, each circuit board having a microphone element coupled thereto. The microphone array includes an insert bracket including a base and a plurality of spaced shaft members extending upwardly therefrom, the base having a plurality of apertures aligned with each shaft member, wherein each shaft member connects to the at least one housing. The microphone array further includes plurality of sealing gaskets each having at least one channel defining an air path extending therethrough, each sealing gasket arranged to be received within one of the plurality of spaced shaft members and extend between the base and the at least one housing. The plurality of sealing gaskets provide acoustic sealing between the insert bracket and the at least one housing such that the air path directs sound from a cabin of the vehicle through the apertures to each microphone element.

DETAILED DESCRIPTION

Figure 1:
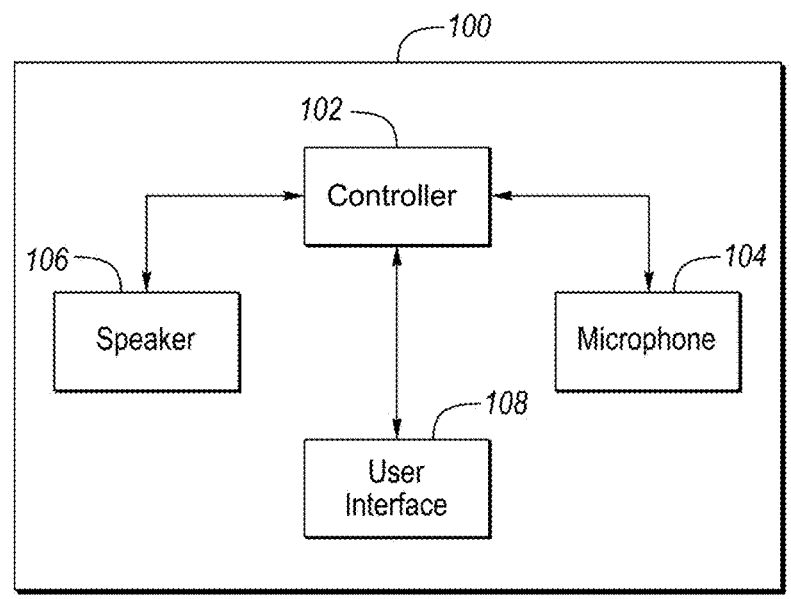
FIG. 1 depicts a noise or sound management system within a vehicle environment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Modern vehicles may include a variety of sound management systems and devices that cooperate to manage the aural environment within the vehicle. For example, a vehicle may include a road noise cancellation (RNC) system that is configured to reduce the amount of road noise heard by vehicle occupants. Such systems typically operate by receiving input from one or more microphones and outputting a signal to one or more loudspeakers that modifies the sound pattern. The systems can mask unwanted road and engine noise, making the cabin seem quieter. Additional applications may include hands-free communication systems and telephone applications. Other vehicle sound management systems may include active noise control (ANC) and in-car communication (ICC) systems.

These vehicle systems use one or more microphones to receive sound/noise input. The microphones may be installed at various locations within the vehicle. Sound propagates through air as a pressure wave. A source may generate a sound by causing a vibration in the air (or other medium). These vibrations then propagate from the source through the medium (e.g., air). A microphone may operate by receiving these pressure waves and converting the pressure waves into an electrical signal. To accomplish this, the microphone may need to be exposed to the pressure wave.

Existing in-vehicle microphones receive the pressure wave through openings that expose the cabin air to the microphone elements. As an example, a microphone may be installed in a headliner of the vehicle. The microphone assembly for installation in the headliner may include a visible A-surface grill that defines one or more openings. The A-surface may be that surface that is visible within the vehicle cabin. The microphone assembly may include a housing that attaches to the grill from a B-side of the headliner. The B-side may be that surface opposite the A-surface and is generally not visible within the cabin. These grills are generally visible within the cabin and may be aesthetically displeasing. In addition, the openings can allow dust and moisture intrusion into the microphone elements which may cause reduced performance.

The increase in the number of headliner microphone grills has created a need for a microphone that does not require an A-surface grill, i.e. an "invisible" microphone. One challenge of integrating a microphone into the headliner is that the headliner manufacturer typically allows a maximum circular cut-out diameter in the headliner substrate material of 6 mm. This maximum hole size of 6 mm has been determined to create no visible evidence at the A-surface of the headliner and therefore it is not visible to a cabin occupant. A microphone assembly requires a larger size than 6 mm in diameter and therefore a microphone cannot be designed to fit within this 6 mm hole in the headliner. Therefore, the microphone needs to be located further away from the headliner and that may lead to sealing problems and nonlinear microphone frequency response.

Embodiments disclosed herein include an invisible microphone assembly which may be built into the headliner of a vehicle, forming a headliner assembly. A cut-out location for the microphone assembly is provided that may be larger than 6 mm in diameter. Embodiments include an insert bracket that is integrated between the substrate and A-surface layers of the headliner and a sealing gasket within the microphone assembly, as described further below.

FIG. 1 depicts a block diagram of a vehicle 100 that includes a controller 102. The controller 102 may include a microprocessor and memory to implement various features and functions. For example, the controller 102 may be part of an RNC system or an ANC system. The controller 102 may be part of an ICC system that manages in-vehicle communications. The controller 102 may also be configured as a sound processor to implement telematics features such as speech recognition and hands-free system operation.

The controller 102 may be electrically connected to one or more microphones 104. The microphones 104 may be in different positions within the vehicle 100. The microphones 104 may be configured to generate an electrical signal representing sound or noise at the position of the microphones 104. The controller 102 may be electrically connected to one or more loudspeakers 106. The loudspeakers 106 may be configured to generate sound based on signals received from the controller 102. The vehicle 100 may further include a user interface 108 in electrical communication with the controller 102. In some examples, the user interface 108 may be a touch-screen display that can display content from the controller 102 and provide inputs (e.g., menu selections) to the controller 102. The user interface 108 may also include buttons and switches. The configuration and usage of the user interface 108 may depend on the purpose of the controller 102.

The vehicle 100 may further include a headliner (not shown in FIG. 1). The headliner may be configured to line an interior of a roof of the vehicle 100. The headliner may be configured to provide noise and thermal insulation within the cabin of the vehicle. The headliner may also be configured for mounting various components. For example, lights, control panels, and microphones may be mounted to the headliner.

Figure 2:
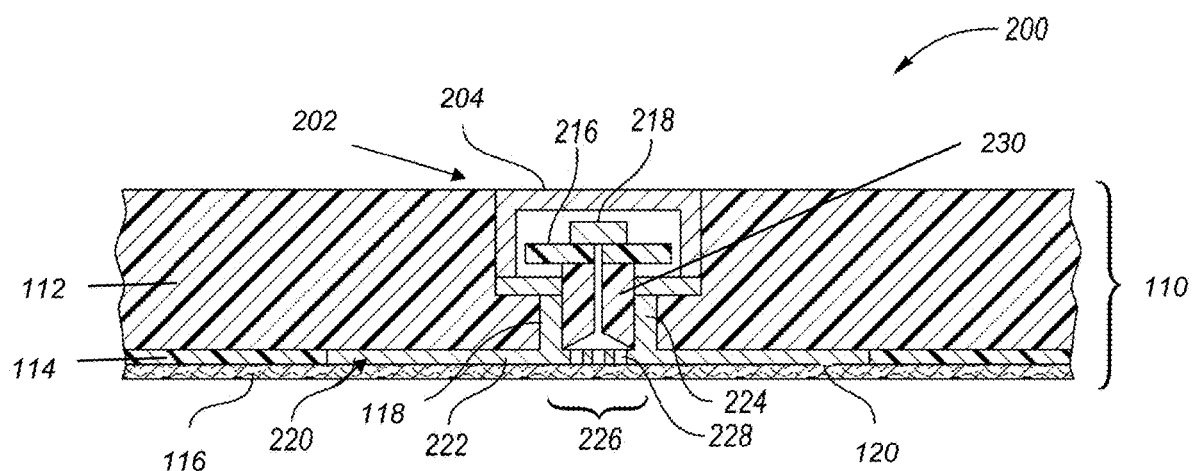
FIG. 2 is a cross-sectional illustration of a microphone assembly in a headliner including an insert bracket and a sealing gasket according to one or more embodiments.
Figure 3:
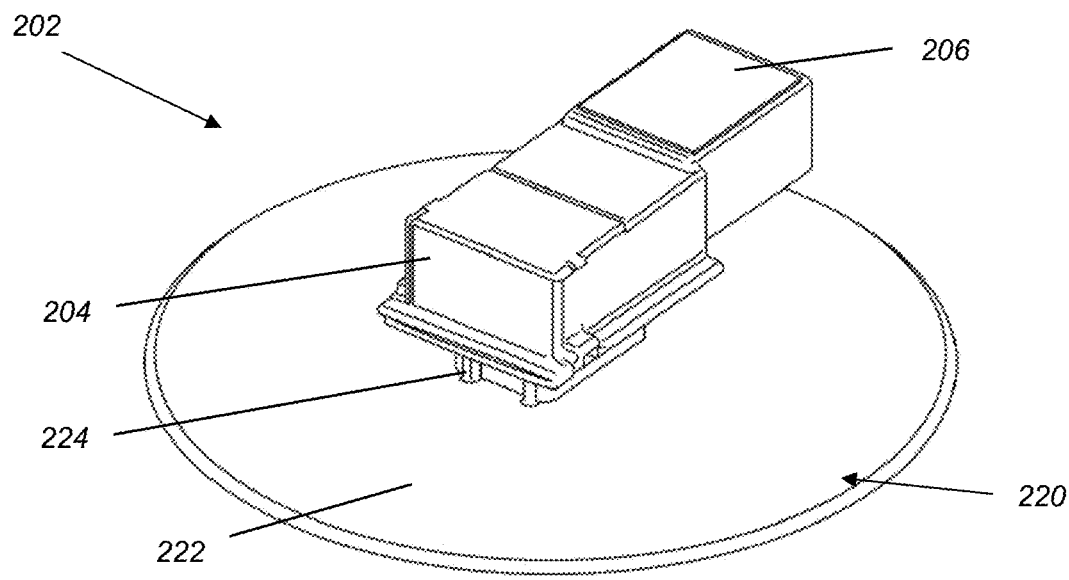
FIG. 3 is a perspective view of a microphone assembly according to one or more embodiments.

FIGS. 2-3 and 5-9 illustrate an invisible microphone assembly 202 that is configured to be installed in a vehicle headliner 110, forming a headliner assembly 200. While the embodiments shown and described herein are directed toward installation in a vehicle headliner, the concepts and assemblies may also be applied to other areas of the vehicle cabin (e.g., side trim, dashboard, console). With reference to FIG. 2, the vehicle headliner 110 may be a multi-layer construction including a substrate layer 112 that provides the backing and structural integrity of the headliner 110. The substrate layer 112 may be constructed of a composite material having application-specific stiffness, strength, and insulating characteristics. The substrate layer 112 is covered by a middle layer 114 which may be constructed from a foam material which, in turn, is covered by an A-surface layer 116 which may be constructed from a cloth material. The A-surface layer 116 may be an acoustically transparent material that allows sound waves to penetrate through the material. For example, the A-surface layer 116 may be an acoustic fabric configured to be acoustically transparent. Acoustically transparent fabrics may include fabrics with an open weave that permits air to pass through easily.

Acoustically transparent materials may be evaluated based on a noise reduction coefficient (NRC) that quantifies the sound absorption of a material. For example, the NRC may be measured by the Standard Test Method for Sound Absorption and Sound Absorption Coefficients by the Reverberation Room Method defined by ASTM International (ASTM C423-17). The NRC may represent the amount of sound that is absorbed by the material. An ideally acoustically transparent material may have an NRC that is zero. In practice, the acoustically transparent material should have a low NRC.

The middle layer 114 may be bonded or otherwise secured to the substrate layer 112, and the A-surface layer 116 may be bonded or otherwise secured to the middle layer 114. In some configurations, the A-surface layer 116 may be stretch fit across the middle layer 114. The substrate layer 112 may define one or more openings 118, where the shape of each opening 118 may be rectangular, circular, or any other suitable shape. The middle layer 114 may define one or more cavities 120 generally aligned with each opening 118.

Figure 7:
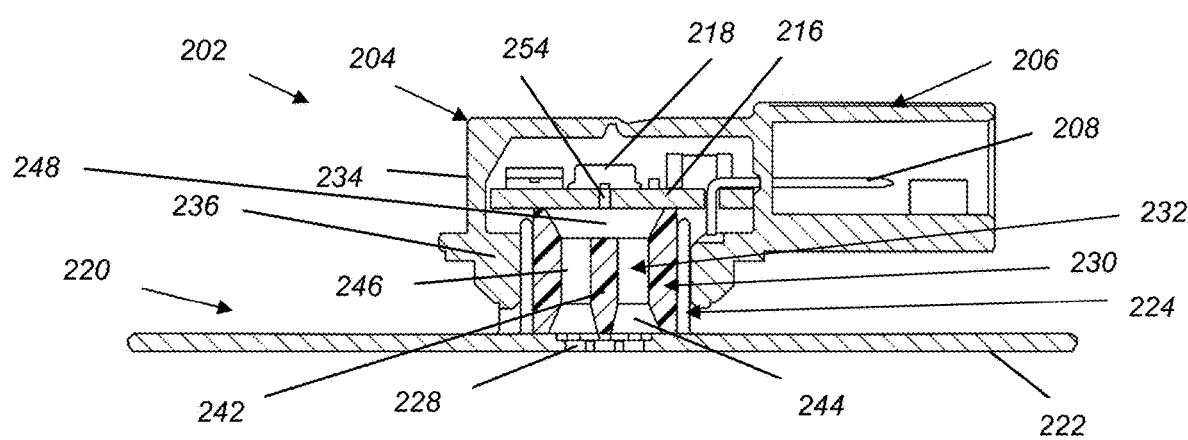
FIG. 7 shows a longitudinal section of the microphone assembly of FIG. 3.
Figure 9:
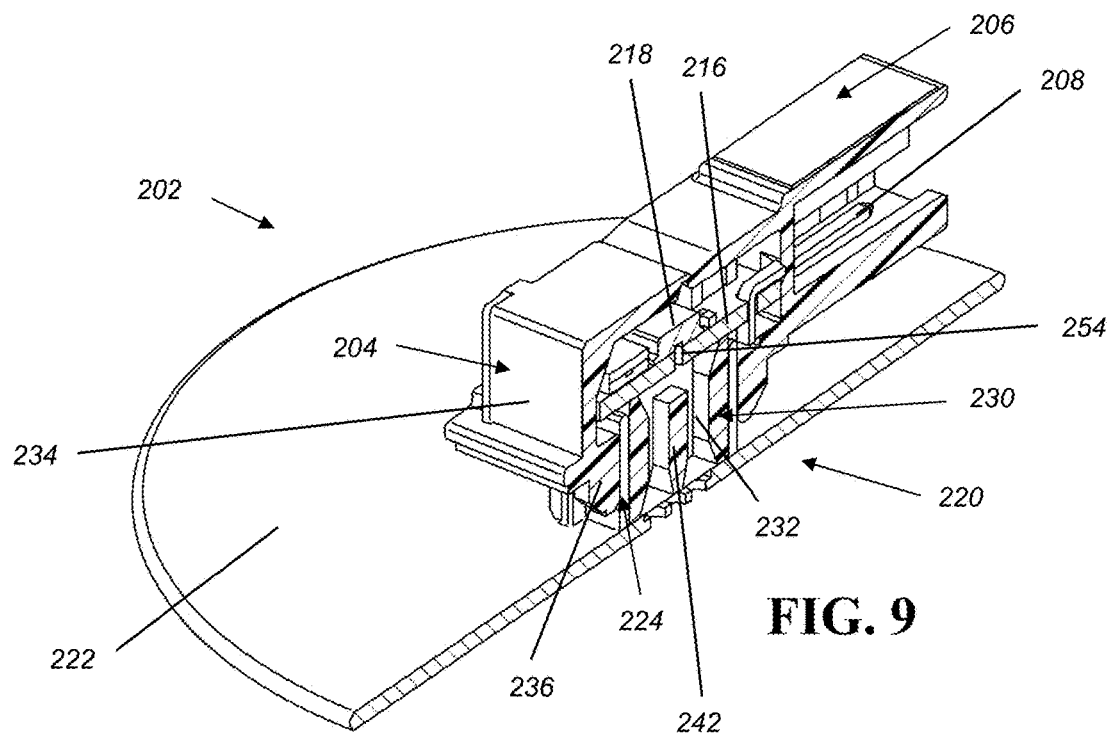
FIG. 9 is a perspective view of the longitudinal section of the microphone assembly shown in FIG. 7.

The headliner assembly 200 includes a microphone assembly 202 having a housing 204. The housing 204 may be configured to enclose and provide structural support for elements of the microphone assembly 202. The housing 204 may be formed of a plastic material but is not limited as such. As best shown in FIGS. 7 and 9, the microphone assembly 202 may include a connector 206 that is configured to receive a mating electrical connector (not shown) to transfer electrical signals from the microphone assembly 202 to another system (e.g., controller 102). The connector 206 may include one or more electrically conductive pins 208 or recesses configured to engage corresponding conductive elements of the mating connector. The microphone assembly 202 may include a circuit board (e.g. printed circuit board assembly (PCBA)) 216 mounted within the housing 204. The microphone assembly 202 may include one or more microphone elements 218 coupled to or integrated with the circuit board 216.

The microphone element 218 may have various configurations. The microphone element 218 may utilize microelectromechanical systems (MEMS) technology and may be an integrated circuit/sensor assembly that is mounted to the circuit board 216. In some configurations, an integrated microphone module may be installed in place of the circuit board 216. The microphone element 218 may be a piezoelectric microphone or a condenser microphone. The microphone element 218 may be configured to convert a sound wave at the sensor into an electrical signal. Electrical connection of the microphone element 218 to the circuit board 216 may depend on the type of microphone technology utilized. In some configurations, the microphone element 218 may be directly coupled as components mounted on the circuit board 216. In some configurations, electrical leads from the microphone element 218 may be electrically connected by soldering to the circuit board 216. In some configurations, the microphone element 218 may include a built-in signal processing unit.

The circuit board 216 may include other electrical/electronic components for cooperating with the microphone element 218. The components may include filters and power management features. The electrically conductive portions of the connector 206 may be electrically coupled to traces of the circuit board 216 to transfer signals between the circuit board 216 and the external controller 102. Some features of the circuit board 216 may be included in the microphone element 218.

As illustrated in FIGS. 2-9, the microphone assembly 202 includes an insert bracket 220 which is provided for interfacing with and connecting to the housing 204. The insert bracket 220 is arranged to be received within the substrate layer 112 and the middle layer 114 of the headliner 110, beneath the A-surface layer 116. The insert bracket 220 includes a base 222 with a hollow shaft member 224 extending upwardly therefrom. The base 222 includes a central area 226 aligned with the shaft member 224, where a plurality of small apertures 228 are provided in the central area 226. These apertures 228 provide a sound path from the microphone assembly 202 through the A-surface layer 116 and into the vehicle cabin. The base 222 also provides a backing structure for the cloth A-surface layer 116 so that no depression or evidence of the microphone assembly 202 is presented to the cabin interior. The shaft member 224 may be configured to be received in the opening 118 provided in the substrate layer 112, whereas the base 222 may be configured to be received in the cavity 120 provided in the middle layer 114. Although the base 222 is illustrated herein as being relatively thin and having a generally circular or disc shape, it is understood that the base 222 is not limited to this configuration and that other shapes and thicknesses may alternatively be employed. Similarly, the shaft member 224 is not limited to the generally rectangular shape depicted herein.

The microphone assembly 202 may further include a sealing gasket 230 that is arranged to be received within the shaft member 224 to facilitate connection of the insert bracket 220 to the housing 204. The sealing gasket 230 defines at least one continuous channel 232 which serves as an air path for sound to travel from the apertures 228 through the substrate layer 112 to the microphone element 218. The sealing gasket 230 may be formed of a resilient material, such as rubber, and may be coupled to the circuit board 216. The sealing gasket 230 may aid assembly of the housing 204 and the insert bracket 220 to compensate for any manufacturing tolerances between these elements. Being resilient, the sealing gasket 230 can adjust for any slight discrepancies in the alignment of the shaft member 224 of the insert bracket 220 and the housing 204. The sealing gasket 230 may also provide an acoustic sealing function between the two plastic parts, the shaft member 224 and the housing 204, to prevent leakage of air that enters the channel 232 from exiting at undesired locations. As with the shaft member 224, the sealing gasket 230 is not limited to the generally rectangular shape depicted herein, and other shapes and configurations are fully contemplated.

Figure 4:
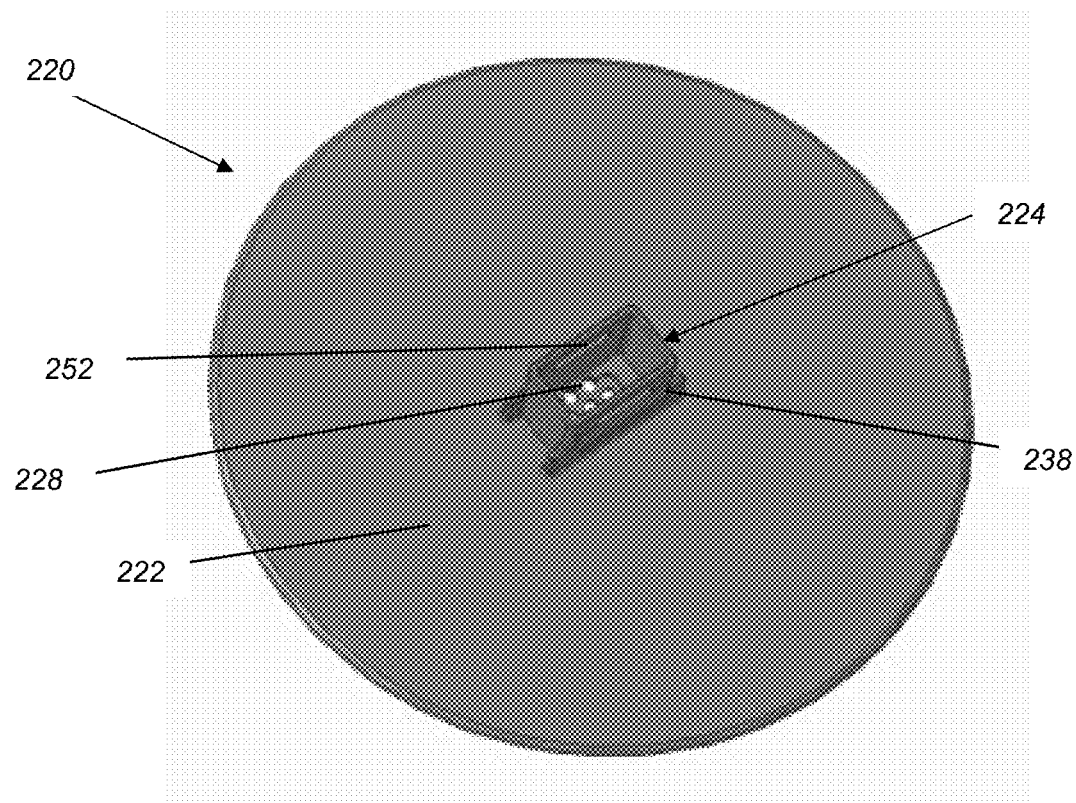
FIG. 4 is a top perspective view of an insert bracket according to one or more embodiments.
Figure 5:
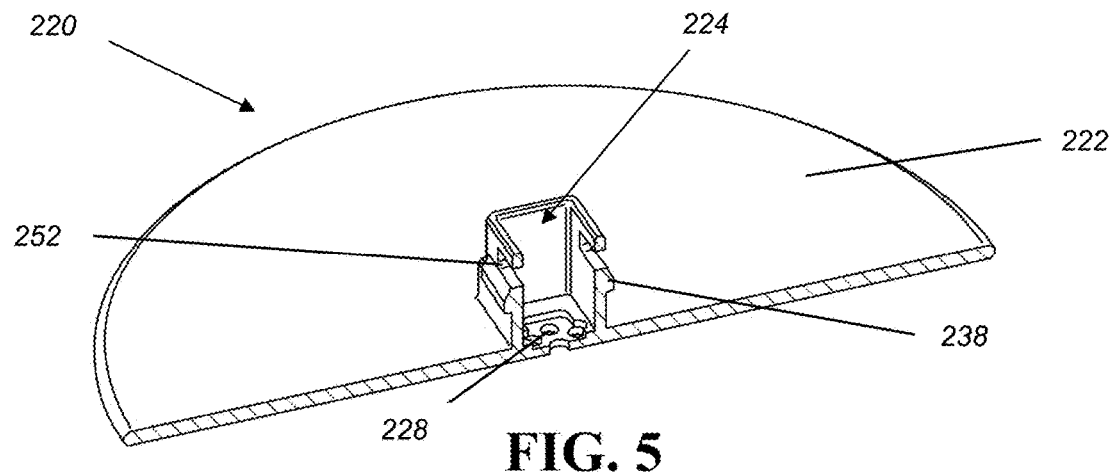
FIG. 5 is a perspective view of a cross-section of the insert bracket of FIG. 4.
Figure 6:
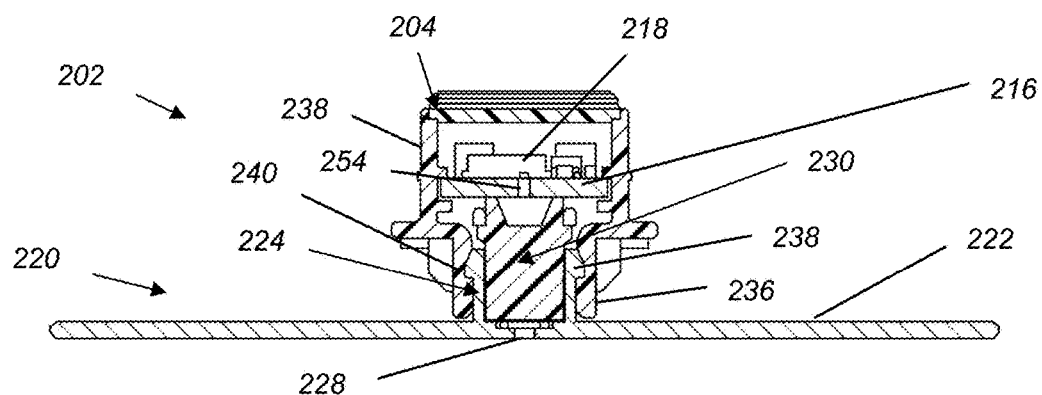
FIG. 6 shows a cross-section of the microphone assembly of FIG. 3.
Figure 8:
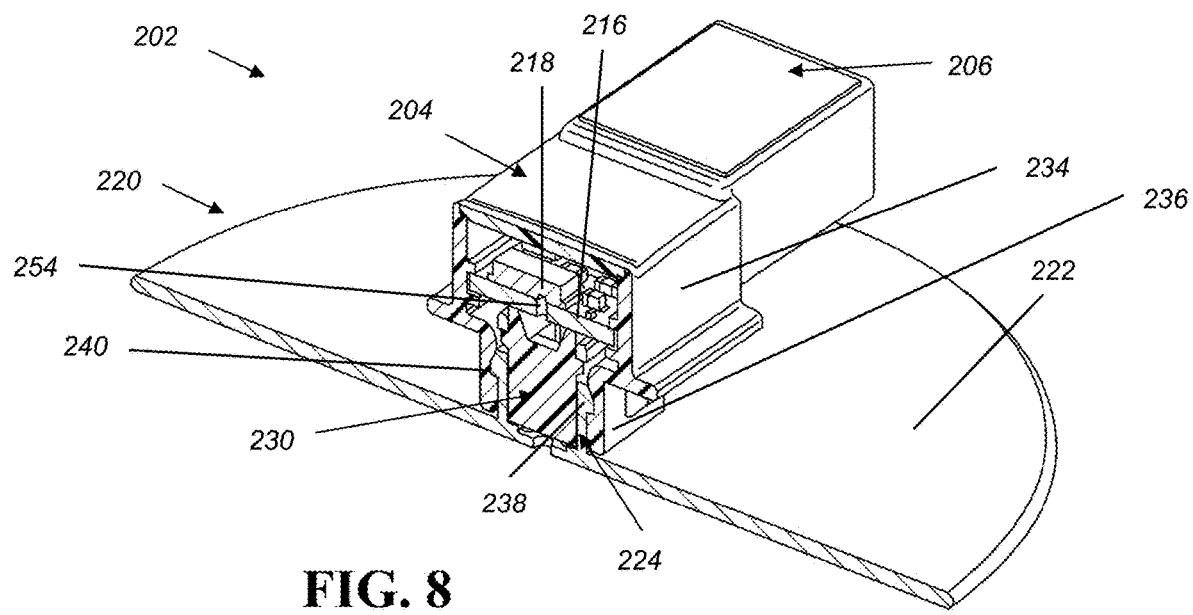
FIG. 8 is a perspective view of the cross-section of the microphone assembly shown in FIG. 6.

The insert bracket 220 is configured to attach to the housing 204 and mount to a side of the substrate layer 112. In some configurations, the base 222 may be bonded to the substrate layer 112 with an adhesive. As best shown in FIGS. 6 and 8, the housing 204 may have a first or upper portion 234 and a second or lower portion 236. The upper portion 234 may house the circuit board 216 and the coupled microphone element 218, and the lower portion 236 may engage the shaft member 224 for connecting the insert bracket 220 to the housing 204. For example, as best shown in FIGS. 4 and 5, the shaft member 224 may include a mounting feature such as at least one tab 238 extending therefrom, wherein each tab 238 is arranged to be received in a corresponding groove 240 in the lower portion 236 of the housing 204 to achieve a snap fit connection between the shaft member 224 and the housing 204. In the depicted arrangement, the lower portion 236 is received on and secured to an outer side of the shaft member 224. Of course, it is understood that the shaft member 224 could alternatively contain a groove and the lower portion 236 have a tab, that the inner and outer positions of the lower portion 236 and shaft member 224 could be reversed, or that the housing 204 and the insert bracket 220 could be secured together via another mechanical configuration or via an adhesive.

Although depicted as being vertically oriented with respect to the substrate layer 112, the shaft member 224 may be oriented at angles other than ninety degrees relative to the substrate layer 112 to emphasize sound collection from different directions. The sealing gasket 230 may also be adjusted accordingly to create a continuous air path through the substrate layer 112 to the microphone element 218. As such, the one or more openings 118 may cut through the substrate layer 112 at different angles.

Figure 10:
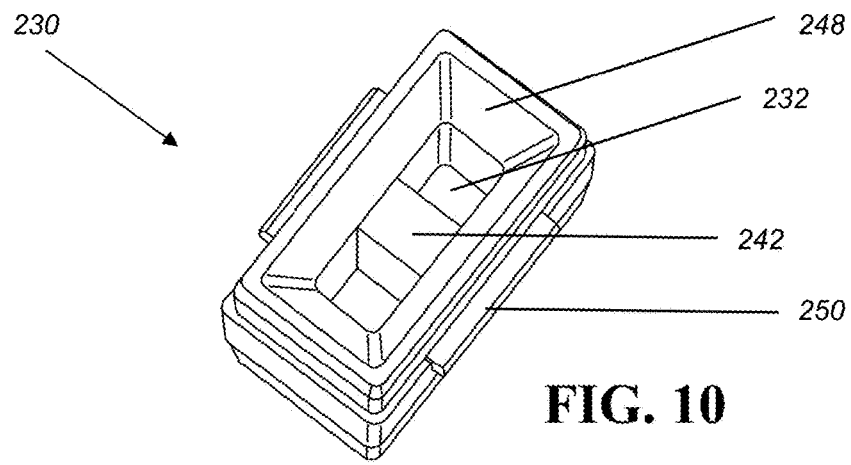
FIG. 10 is a top perspective view of a sealing gasket according to one or more embodiments.

In the embodiment illustrated herein in FIGS. 7 and 9-10, the sealing gasket 230 defines two longitudinally extending channels 232 separated by a central member 242. The central member 242 provides structural support for the sealing gasket 230 but may not extend the full length thereof. The sealing gasket 230 is depicted herein as having generally rectangular channels 232 which define rectangular air paths. With reference to FIG. 7, the channels 232 may have a larger cross-section at a bottom region 244 of the sealing gasket 230 adjacent the base 222 as compared to a middle region 246 of the sealing gasket 230, and the channels 232 may merge into a common air path at a top region 248 of the sealing gasket 230 adjacent the circuit board 216 and microphone element 218, wherein the microphone element 218 is in fluid communication with the channel(s) 232 and air path(s). It is understood that the shape and configuration of the channels 232 and defined air paths are not limited to this example, and other numbers (e.g. single or more than two) and shapes of the channels 232 and air paths are possible. For example, the channels 232 could alternatively have a uniform cross-sectional area along the length of the sealing gasket 230. The cross-sectional area and length of the channel(s) 232 and defined air path(s) may be selected to result in a predetermined frequency response.

As best shown in FIGS. 4-5 and 10, the sealing gasket 230 may have one or more protrusions 250 extending outwardly therefrom which are each sized to be received within a corresponding opening 252 provided in the shaft member 224. This mating connection between the sealing gasket 230 and the shaft member 224 may serve to locate these elements with respect to one another, ensuring proper location of the sealing gasket 230 within the shaft member 224 and ensuring the desired positioning of the sealing gasket 230 with respect to the upper portion 234 of the housing 204 when the lower portion 236 is joined with the insert bracket 220.

The microphone element 218 may be mounted to the circuit board 216 in a variety of ways. The mounting may depend on the location of a port or receiver (not shown) of the microphone element 218. The port or receiver may be the part of the microphone element 218 that is exposed to the sound wave. In some configurations, the microphone element 218 may be mounted such that the port is aligned with the air path formed by the sealing gasket 230 such the air path directs sound from the vehicle cabin to the microphone element(s) 218. In some configurations, the microphone element 218 may be mounted on an opposite side of the circuit board 216 (e.g., opposite the air path) and the circuit board 216 may define a conduit 254 (see FIGS. 6-9) to extend the air path to the microphone element 218. The port of the microphone element 218 may be mounted toward the conduit 254 defined by the circuit board 216. In some configurations, the microphone element 218 may define a cylindrical port (not shown) that is aligned with the air path. In one example, the conduit 254 in the circuit board 216 may receive the cylindrical port.

Figure 11:
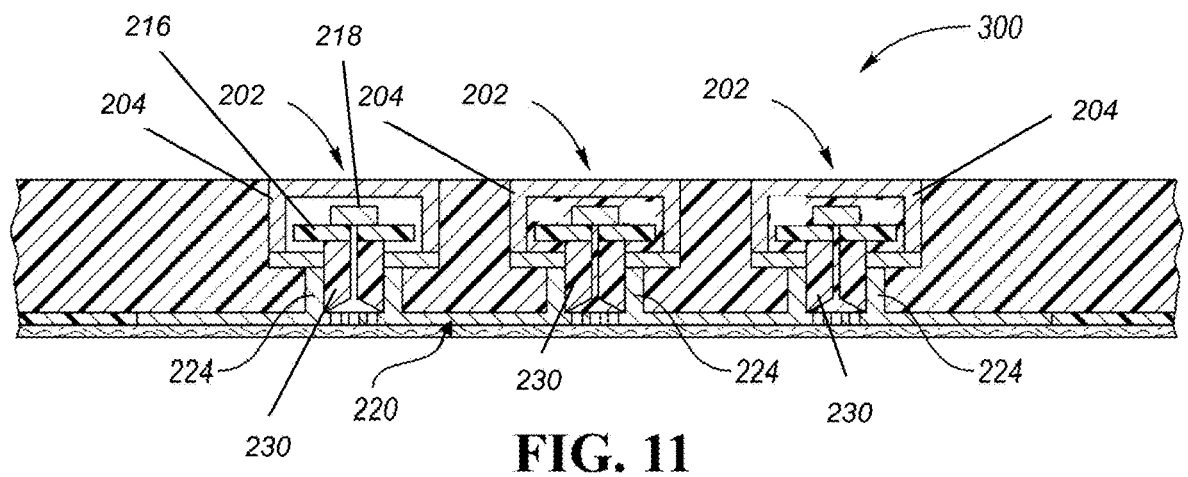
FIG. 11 is a cross-sectional illustration of an array of microphone assemblies in a headliner which includes a corresponding insert bracket according to one or more embodiments.
Figure 12:
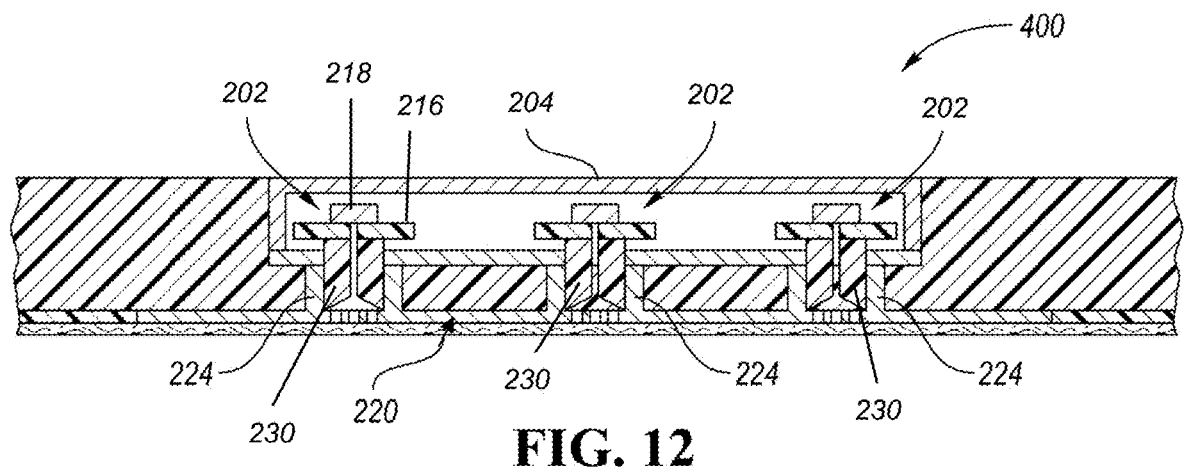
FIG. 12 is a cross-sectional illustration of an array of microphone assemblies in a headliner which includes a common housing and a corresponding insert bracket according to one or more embodiments.

In one or more embodiments, multiple microphone assemblies 202 may be used to create an invisible microphone array 300 as illustrated in FIG. 11. In this example, a plurality of separate housings 204, each including a circuit board 216 and coupled microphone element 218, are provided, and an insert bracket 220 having a plurality of spaced shaft members 224 is utilized to connect to the separate housings 204. The components and features of the microphone assembly 202, the housing 204, the insert bracket 220, and the sealing gasket 230 described in connection with FIGS. 2-10 may be equally applicable to the array 300 of FIG. 11. In an alternative embodiment illustrated in FIG. 12, an invisible microphone array 400 is shown which includes a common housing 204 into which a plurality of circuit boards 216 and coupled microphone elements 218 are mounted, and an insert bracket 220 having a plurality of spaced shaft members 224 is utilized to connect to the common housing 204. Again, the components and features of the microphone assembly 202, the housing 204, the insert bracket 220, and the sealing gasket 230 described in connection with FIGS. 2-10 may be equally applicable to the array 400 of FIG. 12.

It is understood that directional terms such as, but not limited to, top, bottom, upper and lower are used herein to describe the relative orientation of elements and are not intended to be limiting.

The invisible microphone assembly 202 (and arrays 300, 400) utilizing the disclosed insert bracket 220 provides the advantage that the microphone assembly 202 is concealed from view within the vehicle cabin. Occupants within the vehicle may be unable to detect the presence of the microphone assembly 202, allowing for a more consistent, unbroken headliner surface than previous grill designs. Another advantage is that the air paths are covered by the A-surface layer 116 so that dust and other contaminants cannot enter and, as such, fewer issues with reduced performance can be expected. Embodiments disclosed herein also allow the microphone assembly 202 to be located closer to the A-surface layer 116 which results in more linear frequency response of the microphone element 218. The sealing gasket 230 joins the housing 204 and the insert bracket 220 with a sealed connection, defining the air path(s) from the vehicle cabin to the microphone element 218. Accordingly, the microphone assembly 202 provides improved rear noise rejection due to the proper acoustic sealing provided by the sealing gasket 230 between the vehicle cabin and the microphone element 218.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A microphone assembly for a headliner of a vehicle, comprising:
   a housing arranged to be received within a substrate layer of the headliner, the housing having an upper portion and a lower portion;
   a circuit board mounted in the upper portion, the circuit board having a microphone element coupled thereto;

an insert bracket including a base and a shaft member extending upwardly therefrom, the base having a plurality of apertures aligned with the shaft member, wherein the shaft member engages the lower portion to connect the insert bracket to the housing; and a sealing gasket having at least one channel defining an air path extending therethrough, the sealing gasket arranged to be received within the shaft member and extend between the base and the upper portion, the sealing gasket providing acoustic sealing between the insert bracket and the housing such that the air path directs sound from a cabin of the vehicle through the apertures to the microphone element.

2. The microphone assembly of claim 1, wherein the sealing gasket is coupled to the circuit board and the microphone element is aligned with the air path.

3. The microphone assembly of claim 1, wherein the base is covered by an A-surface layer of the headliner, the A-surface layer constructed from an acoustically transparent material.

4. The microphone assembly of claim 1, wherein the base is arranged to be secured to the substrate layer and received within a cavity in a middle foam layer of the headliner.

5. The microphone assembly of claim 1, wherein the shaft member and the lower portion of the housing are connected via a snap fit arrangement.

6. The microphone assembly of claim 1, wherein the sealing gasket includes two longitudinally extending channels separated by a central member.

7. The microphone assembly of claim 6, wherein the channels have a larger cross-section at a bottom region of the sealing gasket compared with a middle region of the sealing gasket, and the channels merge into a common air path at a top region of the sealing gasket.

8. The microphone assembly of claim 1, wherein the sealing gasket has one or more protrusions extending outwardly therefrom which are each sized to be received within a corresponding opening provided in the shaft member for locating the sealing gasket with respect to the shaft member.

9. A headliner assembly for a vehicle, comprising:
a headliner including a substrate layer having an opening and an A-surface layer that is acoustically transparent and is exposed to a cabin of the vehicle; and
a microphone assembly including
a housing arranged to be received within the substrate layer, the housing having an upper portion and a lower portion;
a circuit board mounted in the upper portion, the circuit board having a microphone element coupled thereto;
an insert bracket including a base and a shaft member extending upwardly therefrom, the base having a plurality of apertures aligned with the shaft member, wherein the shaft member engages the lower portion to connect the insert bracket to the housing; and
a sealing gasket having at least one channel defining an air path extending therethrough, the sealing gasket arranged to be received within the shaft member and extend between the base and the upper portion, the sealing gasket providing acoustic sealing between the insert bracket and the housing such that the air path directs sound from the cabin of the vehicle through the apertures to the microphone element.

10. The headliner assembly of claim 9, wherein the sealing gasket is coupled to the circuit board and the microphone element is aligned with the air path.

11. The headliner assembly of claim 9, wherein the base is covered by the A-surface layer.

12. The headliner assembly of claim 9, wherein the base is arranged to be secured to the substrate layer and received within a cavity of a middle foam layer of the headliner.

13. The headliner assembly of claim 9, wherein the sealing gasket includes two longitudinally extending channels separated by a central member.

14. The headliner assembly of claim 13, wherein the channels have a larger cross-section at a bottom region of the sealing gasket compared with a middle region of the sealing gasket, and the channels merge into a common air path at a top region of the sealing gasket.

15. The headliner assembly of claim 9, wherein the sealing gasket has one or more protrusions extending outwardly therefrom which are each sized to be received within a corresponding opening provided in the shaft member for locating the sealing gasket with respect to the shaft member.

16. A microphone array for a headliner of a vehicle, comprising:
at least one housing arranged to be received within a substrate layer of the headliner;
a plurality of circuit boards mounted in the at least one housing, each circuit board having a microphone element coupled thereto;
an insert bracket including a base and a plurality of spaced shaft members extending upwardly therefrom, the base having a plurality of apertures aligned with each shaft member, wherein each shaft member connects to the at least one housing; and
a plurality of sealing gaskets each having at least one channel defining an air path extending therethrough, each sealing gasket arranged to be received within one of the plurality of spaced shaft members and extend between the base and the at least one housing, the plurality of sealing gaskets providing acoustic sealing between the insert bracket and the at least one housing such that the air path directs sound from a cabin of the vehicle through the apertures to each microphone element.

17. The microphone array of claim 16, wherein the at least one housing includes a plurality of separate housings, each separate housing having one of the plurality of circuit boards and coupled microphone elements mounted therein.

18. The microphone array of claim 16, wherein the at least one housing includes a common housing in which the plurality of circuit boards and coupled microphone elements are mounted.

19. The microphone array of claim 16, wherein the at least one housing includes an upper portion and a lower portion, the plurality of circuit boards and coupled microphone elements mounted in the upper portion, and the lower portion interfacing with the plurality of spaced shaft members to connect the insert bracket to the at least one housing.

20. The microphone array of claim 16, wherein the base is arranged to be secured to the substrate layer, received within a cavity in a middle foam layer of the headliner, and covered by an A-surface layer of the headliner, the A-surface layer constructed from an acoustically transparent material.

* * * * *